(12) United States Patent
Shrader et al.

(10) Patent No.: US 10,887,902 B2
(45) Date of Patent: Jan. 5, 2021

(54) WIRELESS DEVICE REPORTING

(71) Applicant: Telefonaktiebolaget LM Ericsson (publ), Stockholm (SE)

(72) Inventors: David Shrader, Wilton Manors, FL (US); Stefano Sorrentino, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/717,614

(22) Filed: Dec. 17, 2019

(65) Prior Publication Data
US 2020/0128575 A1  Apr. 23, 2020

Related U.S. Application Data

(63) Continuation of application No. 15/642,877, filed on Jul. 6, 2017, now abandoned, which is a continuation
(Continued)

(51) Int. Cl.
*H04W 72/12* (2009.01)
*H04W 76/14* (2018.01)
*H04W 24/10* (2009.01)

(52) U.S. Cl.
CPC ....... *H04W 72/1268* (2013.01); *H04W 24/10* (2013.01); *H04W 72/1284* (2013.01); *H04W 76/14* (2018.02)

(58) Field of Classification Search
None
See application file for complete search history.

(56) References Cited

U.S. PATENT DOCUMENTS 6,405,250 B1  6/2002  Lin et al.
7,515,616 B2  4/2009  Yi et al.
(Continued)

FOREIGN PATENT DOCUMENTS

CN    1675944 A    9/2005
CN  101111084 A    1/2008
(Continued)

OTHER PUBLICATIONS

3GPP, "3rd Generation Partnership Project; Technical Specification Group Services and System Aspects;Study of charging support of Proximity-based Services (ProSe) Direct Communication for Public Safety use (Release 12)", 3GPP TR 32.844 V0.2.0, Aug. 2014, pp. 1-3.
(Continued)

*Primary Examiner* — Rebecca E Song
(74) *Attorney, Agent, or Firm* — Murphy, Bilak & Homiller, PLLC

(57) ABSTRACT

There is disclosed a method for operating a wireless device in a wireless communication network. The method comprises configuring, by the wireless device, a reporting time window for transmitting a report to the wireless communication network and determining, by the wireless device, whether data transmission from the wireless device to the wireless communication network is scheduled for a transmission time within the reporting time window, as well as transmitting the report together with the scheduled data transmission if it is determined that such is scheduled for a transmission time within the reporting time window. There are also disclosed corresponding methods and devices.

3 Claims, 8 Drawing Sheets

Related U.S. Application Data of application No. 14/760,133, filed as application No. PCT/SE2014/051197 on Oct. 10, 2014, now Pat. No. 9,723,624.

(56) References Cited

U.S. PATENT DOCUMENTS

| | | |
|---|---|---|
| 9,723,624 B2 | 8/2017 | Shrader et al. |
| 2006/0032304 A1 | 2/2006 | Miller |
| 2010/0150114 A1 | 6/2010 | Che et al. |
| 2011/0281583 A1 | 11/2011 | Hole |
| 2013/0315150 A1 | 11/2013 | Koskinen |
| 2014/0025482 A1 | 1/2014 | Steelberg et al. |
| 2014/0056163 A1 | 2/2014 | Rong et al. |
| 2014/0105166 A1 | 4/2014 | Yamada et al. |
| 2014/0226500 A1 | 8/2014 | Zhou et al. |
| 2014/0324862 A1 | 10/2014 | Bingham et al. |
| 2014/0329494 A1* | 11/2014 | Zisimopoulos ....... H04M 15/88 455/406 |
| 2016/0100355 A1* | 4/2016 | Chen ..................... H04W 48/16 370/232 |
| 2016/0261757 A1* | 9/2016 | Rajadurai ......... H04W 12/0403 |
| 2016/0278115 A1 | 9/2016 | Shrader et al. |
| 2016/0345080 A1 | 11/2016 | Saikusa |

FOREIGN PATENT DOCUMENTS

| | | |
|---|---|---|
| CN | 102413548 A | 4/2012 |
| EP | 2222109 A1 | 8/2010 |
| GB | 2494108 A | 3/2013 |
| RU | 2445755 C2 | 3/2012 |
| WO | 2009067262 A2 | 5/2009 |
| WO | 2014098906 A1 | 6/2014 |

OTHER PUBLICATIONS

3GPP, "Universal Mobile Telecommunications System (UMTS); LTE; Proximity-based Services (ProSe); Security aspects (Release 12)", 3GPP TS 33.303 version 12.1.0, Sep. 2014, pp. 1-48.

3GPP, "Universal Mobile Telecommunications System (UMTS); LTE; Proximity-based services (ProSe); Stage 2 (Release 12)", 3GPP TS 23.303 version 12.2.0, Sep. 2014, pp. 1-61.

3GPP, "Universal Mobile Telecommunications System (UMTS); LTE; Proximity-services Management Object (MO) (Release 12)", 3GPP TS 24.333 version 12.0.0, Sep. 2014, pp. 1-46.

* cited by examiner

Method for operating a network node

S20 Configuring a wireless device connected or connectable to the network node with a reporting time window for transmitting a report

WIRELESS DEVICE REPORTING

RELATED APPLICATIONS

This application is a continuation of U.S. application Ser. No. 15/642,877 filed 6 Jul. 2017, which is a continuation of U.S. application Ser. No. 14/760,133 filed 9 Jul. 2015, which is a U.S. National Phase Application of PCT/SE2014/051197 filed 10 Oct. 2014. The entire contents of each aforementioned application is incorporated herein by reference.

TECHNICAL FIELD

The present disclosure pertains to reporting by wireless devices to a wireless communication network.

BACKGROUND

For many applications, a wireless device like a user equipment transfers data or reports, e.g. measurement reports, to the network. In many cases, the reports are time critical and/or periodical, e.g. for power control. In many other cases, such reports may be less time critical or aperiodical, for example, if a wireless device participates in D2D communication with another wireless device. In such a case, the wireless device may measure and/or determine information regarding the D2D communication, for example for billing purposes, which may be transferred to the network at a later point in time. It should be noted that D2D communication may be performed even in cases the wireless device is not covered by a cellular network or a cell, so that any report it is preparing would have to be sent when it re-establishes contact with the network.

SUMMARY

The present disclosure discusses approaches and devices allowing a more flexible and resource-efficient operation of a wireless device intended to report to the network.

There is described a method for operating a wireless device in a wireless communication network. The method comprises configuring, by the wireless device, a reporting time window for transmitting a report to the wireless communication network and determining, by the wireless device, whether data transmission from the wireless device to the wireless communication network is scheduled for a transmission time within the reporting time window. The method also comprises transmitting the report together with the scheduled data transmission if it is determined that such is scheduled for a transmission time within the reporting time window.

There is also disclosed a wireless device for a wireless communication network, the wireless device being adapted for, and/or comprising a configuring module for, configuring a reporting time window for transmitting a report to the wireless communication network. The wireless device further is adapted for, and/or comprises a determining module for, determining whether a data transmission from the wireless device to the wireless communication network is scheduled for a transmission time within the reporting time window. Moreover, the wireless device is adapted for, and/or comprises a transmitting module for, transmitting the report together with the scheduled data transmission if it is determined, e.g. by the determining module, that such is scheduled for a transmission time within the reporting time window.

There is also disclosed a method for operating a network node in a wireless communication network. The method comprises configuring a wireless device connected or connectable to the network node with a reporting time window for transmitting a report.

Moreover, there is described a network node for a wireless communication network, the network node being adapted for, and/or comprising a configuring module for, configuring a wireless device connected or connectable to the network node with a reporting time window for transmitting a report.

A program product comprising code executable by control circuitry is described, the code causing the control circuitry to perform and/or control any one method disclosed herein.

There is also disclosed a carrier medium carrying a program product according as described herein and/or code executable by control circuitry, the code causing the control circuitry to perform and/or control any one method disclosed herein.

BRIEF DESCRIPTION OF THE DRAWINGS

FIG. 7 schematically shows a diagram of a method for operating a network node.

DETAILED DESCRIPTION

Figure 1:
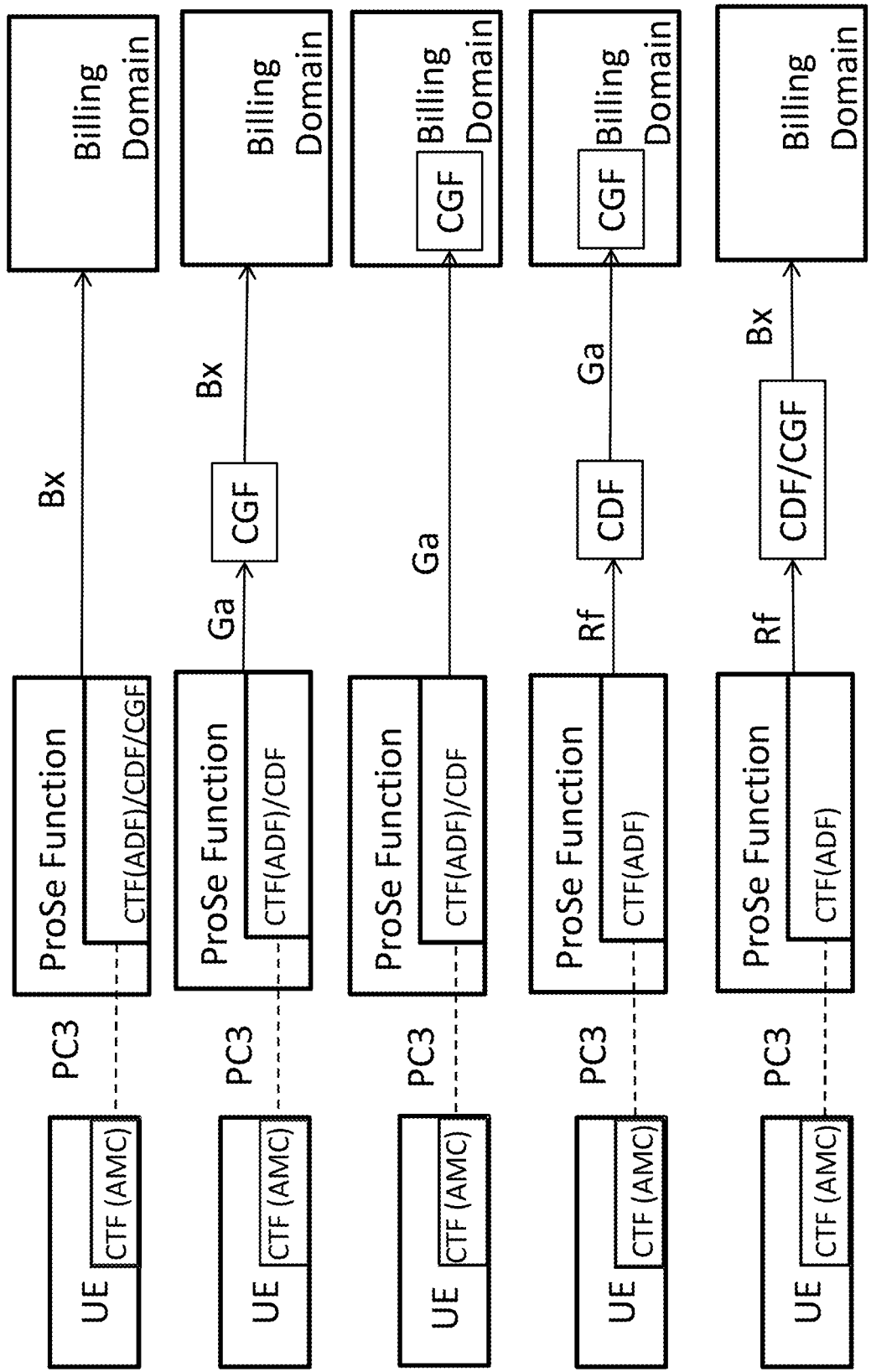
FIG. 1 schematically shows setups for connecting a UE to a billing domain.

Generally, the terms "device-to-device communication", "D2D communication", "peer-to-peer communication", "direct communication" and/or "ProSe communication" or "ProSe Direct communication" and/or related expressions or forms may be used interchangeably.

There is described a method for operating a wireless device in a wireless communication network. The method comprises configuring, by the wireless device, a reporting time window for transmitting a report to the wireless communication network and determining, by the wireless device, whether data transmission from the wireless device to the wireless communication network is scheduled for a transmission time within the reporting time window. The method also comprises transmitting the report together with the scheduled data transmission if it is determined that such is scheduled for a transmission time within the reporting time window. Accordingly, if there is a data transmission in the reporting time window, the wireless device may use the initiation of communication for the data transmission to also transfer the report, and does not have to perform a separate initiation of communication with the network for the report. This saves time and communication resources, and also reduces drain on the power supply of the wireless device. The method may comprise receiving, by the wireless device, of configuration information and/or data from the network. Configuring may be performed based on the configuration information and/or data.

The method may comprise transmitting the report at or after and/or triggered by reaching the end of the reporting time window if it is determined that no data transmission is scheduled for a transmission time within the reporting time window. This transmitting may comprise initiating communication with the network, e.g. by a random access procedure, and/or switching to a RRC connected state.

Alternatively or additionally, the method may comprise configuring a measurement time for measuring data on which the report is based on.

There is also disclosed a wireless device for a wireless communication network, the wireless device being adapted for, and/or comprising a configuring module for, configuring a reporting time window for transmitting a report to the wireless communication network. The wireless device further is adapted for, and/or comprises a determining module for, determining whether a data transmission from the wireless device to the wireless communication network is scheduled for a transmission time within the reporting time window. Moreover, the wireless device is adapted for, and/or comprises a transmitting module for, transmitting the report together with the scheduled data transmission if it is determined, e.g. by the determining module, that such is scheduled for a transmission time within the reporting time window. The wireless device generally may comprise radio circuitry and/or control circuitry, in particular at least one controller or processor and/or a memory arrangement, adapted for controlling the actions described in this disclosure as being performed by a wireless device and/or implementing the modules of a wireless device described in this disclosure. The wireless device may be adapted for, and/or comprise a receiving module for, receiving configuration information and/or data from the network. Configuring may be performed based on the configuration information and/or data.

The wireless device, and/or the transmitting module, may further be adapted for transmitting the report at or after and/or triggered by reaching the end of the reporting time window if it is determined that no data transmission is scheduled for a transmission time within the reporting time window. This transmitting may comprise initiating communication with the network, e.g. by a random access procedure, and/or switching to a RRC connected state.

Additionally or alternatively, the wireless device, and/or the configuring module or an optional measurement module, may be adapted for configuring a measurement time for measuring data on which the report is based.

There is also disclosed a method for operating a network node in a wireless communication network. The method comprises configuring, by the network node, a wireless device connected or connectable to the network node with a reporting time window for transmitting a report and/or with a measurement time for measuring data on which the report is based. The method may comprise determining, by the network node, the reporting time window and/or the measurement time.

Moreover, there is described a network node for a wireless communication network, the network node being adapted for, and/or comprising a configuring module for, configuring a wireless device connected or connectable to the network node with a reporting time window for transmitting a report and/or with a measurement time for measuring data on which the report is based. The network node may determine, and/or be adapted for and/or comprise a determining module for determining, the reporting time window and/or a measurement time.

A program product comprising code executable by control circuitry is described, the code causing the control circuitry to perform and/or control any one method disclosed herein.

There is also disclosed a carrier medium carrying a program product according as described herein and/or code executable by control circuitry, the code causing the control circuitry to perform and/or control any one method disclosed herein.

A measurement time may define a measurement interval and/or period (e.g. an interval of repetition of measurements) and/or one or more measurement time points at which at least one measurement has to be performed by the wireless device. The result/s of a measurement may be stored as and/or be basis for usage information and/or a report. The measurement time may be independent of the reporting time window. In particular, the wireless device and/or measurement module may be adapted for, and/or perform, measuring (according to the measurement time) independently and/or outside of the reporting time interval. The wireless device and/or measurement module may be adapted to perform measurements based on the configured measurement time.

There may generally be considered a wireless device adapted for carrying out any of the methods for operating a wireless device described herein. A network node adapted for carrying out any of the methods for operating a network node described herein may be envisaged.

A wireless device may be a user equipment, in particular a user equipment according to LTE. The wireless device may be adapted for D2D operation and/or communication. It may be considered that a wireless device performs, and/or is adapted for and/or comprises a measurement module for, measuring parameters related to D2D operation to provide usage information, which may be comprises in and/or be basis for a report. The report in particular may pertain to and/or comprise billing information, based on which the network or an operator may charge for the D2D operation. A wireless device may be configured, e.g. by the network or a network node, to perform measurements pertaining to D2D operation and/or to provide usage information, in particular during a time in which it is not covered by the network. Generally, the wireless device may comprise a memory and/or be adapted for storing in a memory, data and/or usage information, in particular such as pertaining to the report. It may be considered that the wireless device is configured for not transmitting an empty report, e.g. if the memory is empty and/or no measurement data or usage information for the report is available/stored.

A network node may be implemented as an eNodeB, in particular according to LTE. The network node may be adapted for, and/or comprise a receiving module for, receiving a report from a wireless device, and/or to relay the report to higher layers of the network and/or an operator billing service.

Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

In the following UE or user equipment may be used as an example for or interchangeably with wireless device. eNode or base station may be used as an example for or interchangeably with network node.

For a wireless device, device-to-device communication using a frequency spectrum licensed for cellular communication may be implemented. 3GPP is specifying D2D (equivalently called as ProSe) as part of LTE Rel-12, where licensed spectrum owned by Operators may be shared by D2D connections and cellular connections. Specifically, in 3GPP LTE networks, such D2D communication can be used in commercial applications, such as cellular network off-loading, proximity based social networking, or in public safety situations in which first responders need to communicate with each other and with people in the disaster area.

New charging paradigms may be set up by operators in order to monetize the use of their spectrum for D2D services.

The following principles may be applied in the context of D2D operation/ProSe communication, in particular to a ProSe one-to-many Direct Communication charging architecture (see FIG. 1, which shows different ways of connecting a wireless device (UE) to a billing domain in a) to e)):

In the ProSe Direct Communication charging architecture, the Accounting Metrics Collection (AMC) functional block of the Charging Trigger Function (CTF) is located in the UE, and the Accounting Data Forwarding (ADF) functional block of the CTF is in ProSe Function.

The ProSe Direct Communication usage information is stored securely in the UE and is uploaded to a location configured by the ProSe Function securely over PC3 (a standard interface between a wireless device/UE and the ProSe Function of a network) using, e.g., the mechanism defined in TS 33.303.

The ProSe Function and/or the network or network node may be adapted to configure the wireless device in particular regarding measurement and reporting pertaining to the D2D operation and/or to control the UE uploading behaviour or reporting using service authorization and provisioning mechanism, e.g. as defined in TS 23.303. Possible configuration parameters are defined in TS 24.333.

When the UE is in coverage, it may access and/or communicate with and/or transmit a report to the network or network node or the ProSe Function, e.g. in HPLMN as defined in TS 23.303.

When the UE is out of coverage, it may use pre-stored configuration, e.g. from ME (a memory) or UICC (Universal Integrated Circuit Card), or configuration received (e.g. from the network or network node) while in coverage, for the usage logging and uploading control and/or storing usage information or data and/or transmitting a report.

In the roaming case, inter-PLMN charging may be supported.

In FIG. 1, Rf refers to an offline charging reference point between a 3G (wireless) network element and the CDF; Ga to a reference point for CDR (Charging Data Record) transfer between a CDF and the CGF (Charging Gateway Function), and Bx to a reference point for CDR file transfer between any (generic) 3G (wireless) domain, subsystem or service CGF and a BD (Billing Domain). The billing domain at the reference points and functions outside the UE may be part of a network and be implemented as network nodes. The billing domain may be part of a core network used by an operator for charging use of network/licensed resources by a UE.

When the UE is out of E-UTRAN coverage, the UE may generate reports from the recorded usage information every reporting period and store the non-empty reports in a non-volatile memory, and send or transmit the report's once the UE returns to coverage.

In most cellular networks, a wireless device like a UE has to perform a random access procedure to communicate with the network, e.g. for data transmission or transmitting a report, in particular for cellular communication. It should be noted that a random access procedure or paging generally includes transmission of data from the wireless device to the network. In LTE, UEs need to be in RRC CONNECTED mode in order to communicate with the eNB. The RRC connection is established by a random access or paging procedure. While in RRC CONNECTED, the UE monitors channels and signals more frequently than in IDLE mode and it accordingly consumes more power.

Operators need to receive reports about D2D operation performed by the wireless device relatively often in order to accurately charge for the use of resources; however, such reports may be less time critical than other reports, e.g. reports directly related to channel quality or control of communication. Considering that even IDLE UEs and/or such not in coverage may actively participate to D2D, the power consumption associated to periodic reporting to the network may result in significantly shorter battery life as well as large overhead on the cellular connection.

It may be considered splitting the steps of monitoring/measuring connection parameters relative to D2D charging and the step of reporting such measurements to the network. While monitoring may be performed periodically and at specific points in time, the time for reporting may be chosen by the UE within configurable time windows. A smart UE implementation may combine the charging reports with other cellular communications occurring during the reporting time window.

The proposed approaches in particular allow optimization of the energy consumed by the UE for the purpose of reporting charging measurements in the context of D2D operation.

The description above focuses on charging, but the proposed solutions may be extended to any type of reporting from the UE to the network (NW), in particular less time critical reporting (e.g., enhanced reception reporting associated with broadcast service). Another example is reporting of logs, e.g. logs indicating connections and/or communication partners.

IDLE UEs need to occasionally connect to the eNB (i.e., perform a paging/random access and temporarily switch to RRC CONNECTED mode) even when no user data needs to be transmitted. E.g., UEs need to periodically provide radio measurements for mobility purpose or identify themselves when they change the tracking area. D2D Charging reports are recognized as user data at L1/2 in the LTE protocol stack. This implies that an IDLE UE would need to connect to the NW in order to transmit the charging report.

One aspect suggests that reporting from the UE to the NW must be possible within a time window. Generally, the reporting time window may, e.g., be predetermined or configured by the NW or a network node. E.g., it may be configured that a new report may be provided every T seconds, within a (reporting) time window of W seconds. In a further example, a timer (which may be a timer on the wireless device or UE) may be reset every time a wireless device or UE completes reporting, and the UE must perform a new report before the timer expires; this approach corresponds to setting the end time of the time window to the time when the timer expires and the beginning time to when the timer starts. Typically, reporting periods and contents are configured by the operator and/or the NW or a network node and can be in the order of several minutes for some billing/charging applications.

The wireless device may be adapted to anticipate or delay transmission of reports, in particular of charging reports, within the allowed reporting time window, e.g. in order to reduce the number of dedicated random access procedures needed by lowering the number of processes needed for the sole purpose of transmitting charging reports. E.g., if an IDLE UE temporarily switches to RRC CONNECTED during the allowed reporting window for any purpose not related to charging reporting, the UE may autonomously decide to transmit the charging report while the UE is still in RRC CONNECTED mode.

Figure 2:
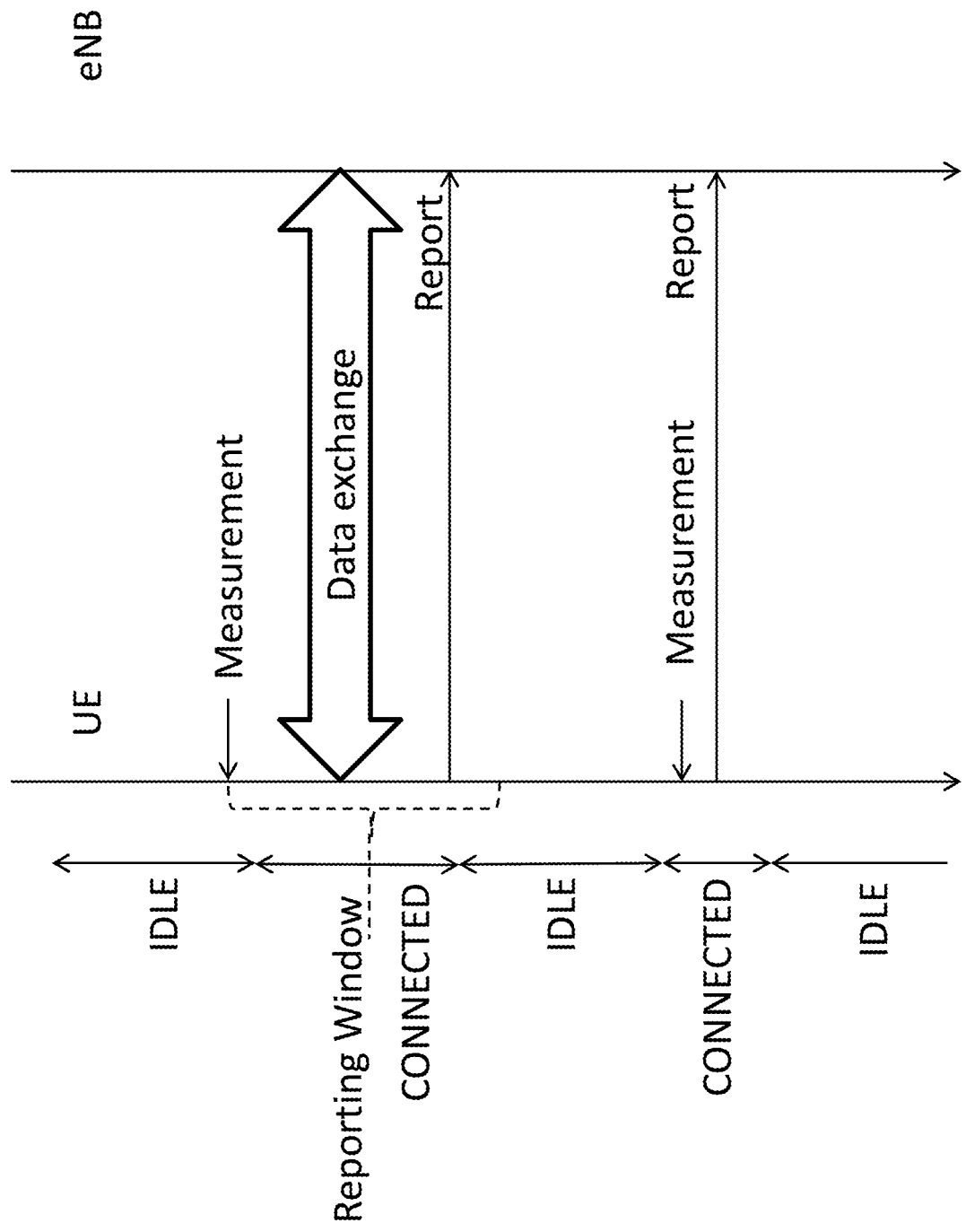
FIG. 2 schematically shows reporting according to an approach described herein.

FIG. 2 shows the data flows during reporting as suggested. A UE is representing a wireless device, a eNB a base station or network node, which may be seen as part of a network and/or represent the network. Time runs from top to bottom as indicated by the arrow heads. During IDLE, the UE does not transmit data to the eNB, at least not user data and/or reports. However, the UE may participate in D2D communication, e.g. with another wireless device. At a given measurement time (Measurement in the FIG. 2), which may be configured by the network, a measurement is taken by the wireless device, e.g. regarding usage information. Instead of coupling a reporting time directly to the measurement time and instantly reporting the measurement result, the wireless device determines whether further data transmission is scheduled during a reporting time window indicated by the punctured line in FIG. 2. As a data exchange is determined (which comprises data transmission), the wireless device transmits the report together with data of the data exchange. In this case, it appends the report to the data exchange. Thus, only one random access procedure is needed for transmitting both the report and the data of the data exchange. FIG. 2 shows a second situation in which the measurement is performed during a connected state, in which case the report may be transmitted directly. In cases in which no connected state (no data transmission) is scheduled during the reporting time window, the report is transmitted at the end or shortly after the end of the reporting time window. In particular, transmitting the report may be triggered by reaching the end of the reporting time window without having determined a scheduled data transmission and/or without the report having been sent.

Figure 3:
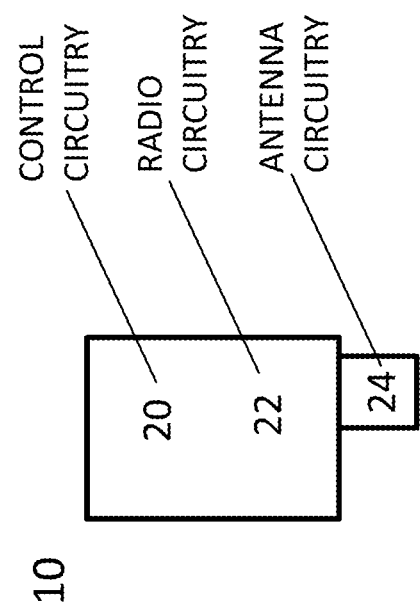
FIG. 3 schematically shows an example of a wireless device.

FIG. 3 schematically shows a wireless device or user equipment 10, which may be a node of or for a device-to-device communication, in closer details. User equipment 10 comprises control circuitry 20, which may comprise a controller connected to a memory. A receiving module and/or transmission module and/or configuring and/or determining module may be implemented in the control circuitry 20, in particular as module in the controller. The user equipment also comprises radio circuitry 22 providing receiving and transmitting or transceiving functionality, the radio circuitry 22 connected or connectable to the control circuitry. An antenna circuitry 24 of the user equipment 10 is connected or connectable to the radio circuitry 22 to collect or send and/or amplify signals. Radio circuitry 22 and the control circuitry 20 controlling it are configured for device-to-device communication, in particular utilizing E-UTRAN/LTE resources as described herein for D2D communication.

Figure 4:
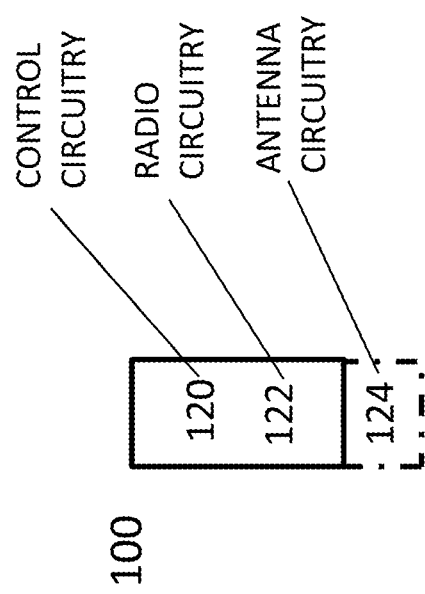
FIG. 4 schematically shows an example of a network node or eNB.

FIG. 4 schematically show a base station 100, which in particular may be an eNodeB. Base station 100 comprises control circuitry 120, which may comprise a controller connected to a memory. A configuring unit and/or a determining module may be comprised or implemented in the control circuitry. The control circuitry is connected to radio circuitry 122 of the base station 100, which provides receiver and transmitter and/or transceiver functionality. An antenna circuitry 124 may be connected or connectable to radio circuitry 122 to provide good signal reception or transmittance and/or amplification.

Figure 5:
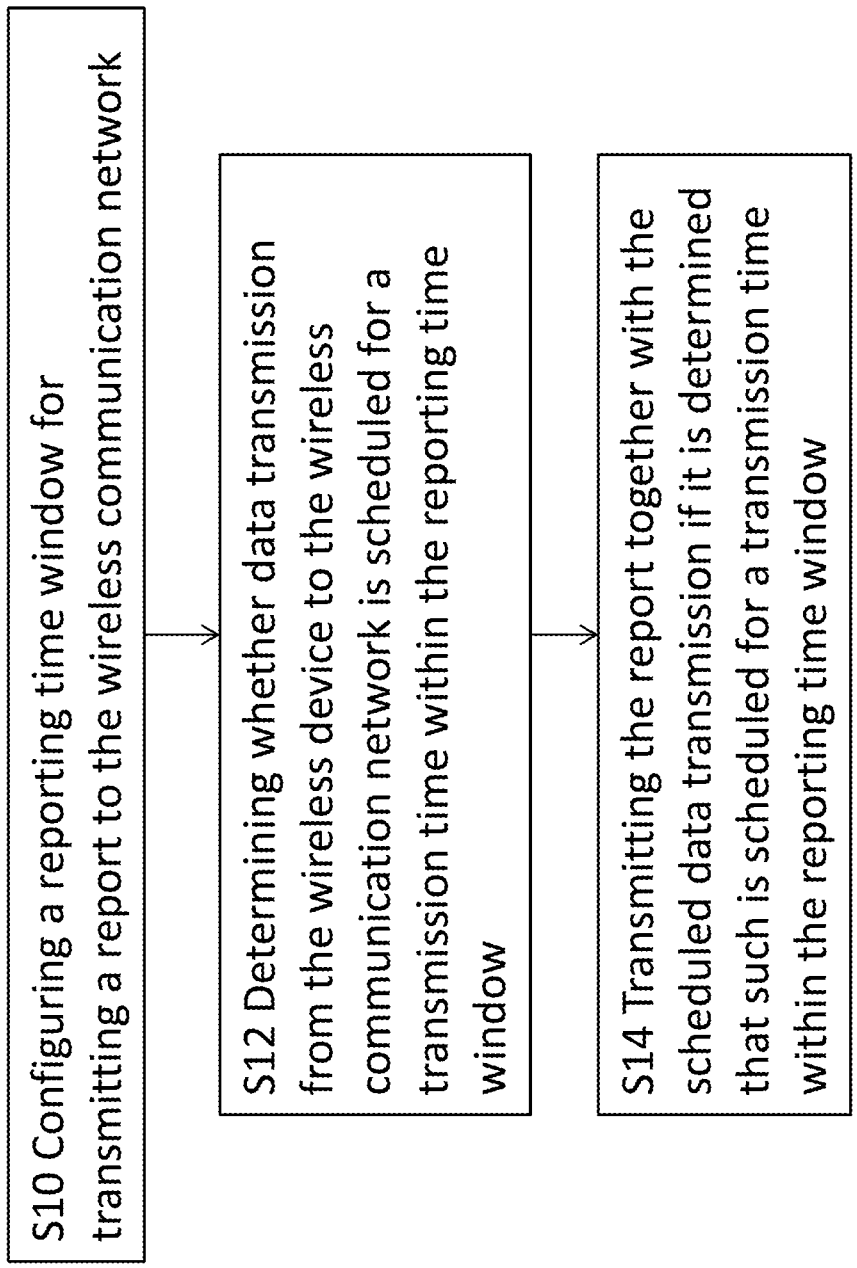
FIG. 5 schematically shows a diagram of a method for operating a wireless device.

FIG. 5 shows a method for operating a wireless device. The method may comprise an action S10, in which the wireless device configures a reporting time window for transmitting a report to the wireless communication network. The configuring may be based upon receiving corresponding information from the network, e.g. via cellular communication. The reporting time window may be periodical, to be used regularly at given times. In an action S12 the wireless device determines whether data transmission from the wireless device to the wireless communication network is scheduled for a transmission time within the reporting time window. For that, it may check the scheduler or a scheduler memory or register and/or monitor the control and/or radio circuitry, in particular one or more transmitters. If there is determined a scheduled data transmission, in an action S14, the wireless device transmits the report together with the data transmission, e.g. by appending the report to the scheduled transmission. If there is no data transmission scheduled and/or detected, reaching the end of the time reporting window may trigger transmitting the report independently.

Figure 6:
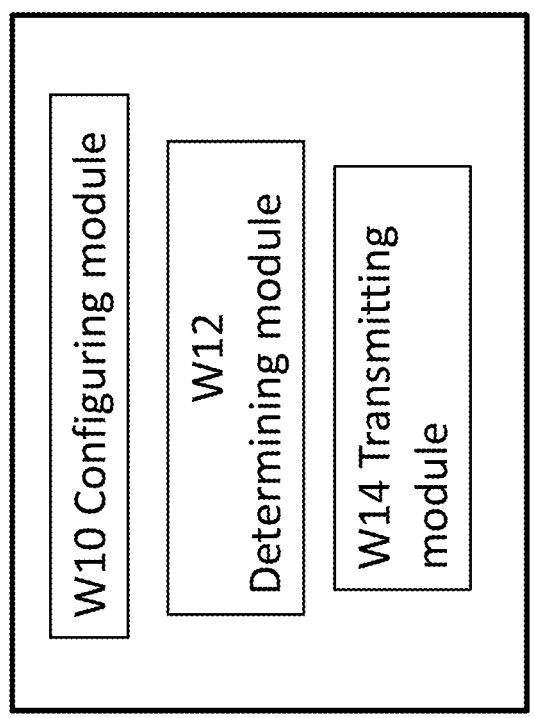
FIG. 6 schematically shows a wireless device.

FIG. 6 shows a wireless device comprising a configuring module W10 for performing S10 as described with reference to FIG. 5. The wireless device further comprises a determining module W12 for performing S12 as described with reference to FIG. 5. Moreover, the wireless device comprises a transmitting module W14 for performing S14 as described with reference to FIG. 5. Generally, the wireless device may be adapted to perform the method as described with reference to FIG. 5.

FIG. 7 shows a method for operating a network node. The method comprises an action S20 of configuring a wireless device connected or connectable to the network node with a reporting time window for transmitting a report. The wireless device may be connected or connectable with to the network for wireless communication, in particular cellular communication. The network node may determine the reporting time window and/or a measurement time. It may be considered that configuring the wireless device comprises transmitting corresponding configuring information to the wireless device.

Figure 8:
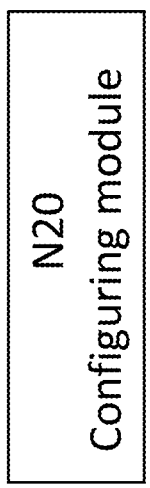
FIG. 8 schematically shows a network node.

FIG. 8 shows a network node. The network node comprises a configuring module W20 for performing S20 as described with reference to FIG. 7. Generally, the network node may be adapted to perform the method as described with reference to FIG. 7.

Alternatively or additionally, the following may be considered: In LTE, UEs need to be in RRC CONNECTED mode in order to communicate with the eNodeB. The RRC connection is established by a random access or paging procedure. While in RRC CONNECTED mode, the UE monitors channels and signals more frequently than in IDLE mode and it accordingly consumes more power.

Considering that even IDLE UEs may actively participate in ProSe Direction Communications Services, the power consumption associated with periodic reporting to the network may result in significantly shorter battery life as well as large overhead on the cellular connection.

Optimization of the energy consumed by the UE for the purpose of reporting charging measurements may be useful. The charging measurements may be seen as usage information or be basis of and/or comprised in a report.

An IDLE UE may need to occasionally connect to the eNodeB (i.e., perform a paging/random access) and temporarily switch to RRC CONNECTED mode even when no user data needs to be transmitted. For example, a UE may need to periodically provide radio measurements for mobility purpose or identify themselves when they change the tracking area.

ProSe Direct Communications Services usage information reports are recognized as user data at layers ½ in the LTE protocol stack. This implies that an IDLE UE must connect to the network (e.g. by moving to RRC connected and/or perform a random access procedure) in order to transmit the charging report and/or other usage information.

In one aspect, the proposed solution suggests splitting the steps of monitoring and measuring usage information parameters for ProSe Direct Communications Service and the step of reporting the measurements to the network. While monitoring may be performed periodically at specific points in time, the time for reporting can be chosen by the UE within a configurable time window. A smart UE implementation is able to combine the charging reports with other cellular communications occurring during the reporting time window.

A part of the solution, which may be an independent part, involves the introduction of a reporting time window configured by the operator or the network, in particular a network node, such that a new report may be provided at T seconds within a window of W seconds. The reporting time window may be a periodic window.

A second part of the solution, which may be an independent part, may involve anticipating or delaying transmission of a report of usage information, in particular of one or more charging reports, within the allowed reporting window in order to reduce the number of dedicated random access procedures needed for the sole purpose of transmitting usage information or charging reports. If an IDLE UE temporarily switches to RRC CONNECTED during the allowed reporting window for any purpose not related to usage information reporting, the UE may autonomously decide to transmit the usage information report while the UE is still in RRC CONNECTED mode. If the IDLE UE does not switch to RRC CONNECTED prior to the end of the reporting window, the UE connects to the network and transmits the usage information report.

The usage information for ProSe Direct Communication may be collected based on the configuration defined in TS 24.333 [241]. The usage information may be collected and recorded associated with the IMSI.

There may be considered to adapt a wireless device or UE such that:

When the UE is in E-UTRAN coverage, if the usage information recorded for the current measurement period is not empty, it shall report the usage information as configured when the one of the following criteria are met:
  a configured measurement period has been reached; the end of an associated configured reporting window has not been reached; and the UE temporarily switches to RRC CONNECTED mode; or
  a configured measurement period has been reached and the end of an associated configured reporting window has been reached.

It should be noted that switching to RRC CONNECTED mode comprises transmitting data to the network.

When the UE is out of E-UTRAN coverage, the UE may generate reports from the recorded/measured/stored usage information every reporting or measuring period and store the non-empty reports in a non-volatile memory, and send the reports once the UE returns to coverage.

In the context of this disclosure, a report may comprise data, e.g. data provided and/or produced by and/or on a wireless device. The report in particular may comprise usage data or usage information and/or user data, in particular regarding ProSe Direct/D2D communication in which the wireless device may and/or may have participated. Usage information may comprise measurement data taken by the wireless device, in particular in the context of D2D operation, e.g. connection data and/or communication data for D2D communication. In particular, in the context of LTE or similar, usage information may comprise any one or any combination of a UE or wireless device identity, e.g. IMSI, a list of serving PLMN IDs when the ProSe Direct Communication is under E-UTRAN coverage, list of the locations of the UE/wireless device, e.g. ECGIs, and the corresponding timestamps, radio/radio circuitry parameters or configurations used for the ProSe Direct Communication, e.g. as defined in TS 24.333 [241], a list of timestamps of when the UE/wireless device goes in/out of E-UTRAN coverage, for every ProSe Direct Communication Group (identified by ProSe L2 Group ID) group parameters used for the ProSe Direct Communication, as defined in TS 24.333 [241], e.g. ProSe L2 Group ID, IP Multicast Address, Source IP address, etc, and/or timestamp of the first one-to-many communication transmission/reception; identities of the transmitters in the one-to-many communication session, e.g. Source L2 ID and IP address, amount of data transmitted by UE or wireless device, amount of data transmitted by UE or wireless device when in E-UTRAN coverage, amount of data transmitted by UE or wireless device when out of E-UTRAN coverage, amount of data received by UE, amount of data received by UE when in E-UTRAN coverage, amount of data received by UE when out of E-UTRAN coverage and/or application specific data, e.g. application specific session floor control information, application layer User ID of group members in the communication.

Configuring a, or by a, wireless device may comprise setting one or more parameters and/or registers of the wireless device and/or tune and/or set one or more components or subsystems and/or circuitry, e.g. a control circuitry and/or radio circuitry, in particular to bring the wireless device into a desired operation mode, e.g. for transmitting and/or receiving data according to allocated resources and/or as scheduled by a network node and/or to be configured for communication via or with one or more cells of a cellular network and/or one or more than one ProSe enabled devices. A wireless device may be adapted for configuring itself, e.g. based on configuration and/or allocation data, which it may receive from a network or network node.

Configuring a time or period or time window, in particular a reporting time window, may comprise defining and/or determining and/or setting parameters or control circuitry of the wireless device and/or the wireless device such that the time or period or window or reporting time window is set and/or the wireless device transmits according to the corresponding conditions described herein. A wireless device may be configured for measurement operation and/or for performing specific measurements, e.g. by setting/defining specific measurement periods and/or intervals, and/or which parameters to measure and/or report. A wireless device may be configured for transmitting a report, by e.g. setting and/or defining which data or parameter/s to transmit and/or when and/or how often to transmit and/or on which channel and/or carrier to transmit. Configuring a wireless device by a network and/or network node may comprise transmitting information, e.g. instructions and/or parameters, for configuration/configuring to the wireless device from the network and/or the network node. The wireless device and/or a configuring module of the wireless device may be adapted for, and/or perform, receiving the information and/or configuring based upon the information.

A wireless device may generally be a device adapted for cellular communication, e.g. within a cellular network and/or with a network node, in particular according to a mobile telecommunication standard, for example according to LTE. A wireless device may comprise and/or be referred to as user equipment and/or mobile terminal or simply terminal. It may be considered that a wireless device is ProSe-enabled and/or may be implemented as or comprise a D2D enabled device.

Communicating with and/or transmitting data to a network may generally comprise communicating with and/or transmitting data to a network node, e.g. an eNodeB, which may relay data to upper layers of the network, e.g. a ProSe function and/or a billing domain, as e.g. shown in FIG. 1.

A time window, in particular a reporting time window, may define a time interval and/or a size of a time interval. A time window may have a beginning or beginning time and an end or end time, which may define the beginning and the end of the window or interval, respectively. A time window may be parametrised e.g. by the end time and the beginning time, or in another example by defining a midpoint or reference point (in time) of the interval and a tolerance or difference in both directions or one tolerance or difference for each direction from the midpoint. The time window, in particular a reporting time window, may be periodic, e.g. configured to be repeated such that the size of the time interval is the same, but the point in time it is arranged around is changed and/or is periodic, to be repeated at regular time periods.

Determining whether data transmission is scheduled for a transmission time may comprise reading from a memory and/or register and/or scheduler and/or scheduling memory and/or checking a transmission schedule and/or settings of a transmitter. The determining may be performed before the reporting time window is reached, e.g. by checking a schedule, e.g. reading it from memory, and/or during the reporting time window, e.g. by checking the schedule and/or monitoring transmissions and/or radio or control circuitry. Determining may be performed at one or more points in time, in particular before and/or at the beginning of the reporting time window. It may be considered alternatively or additionally that determining is performed continuously and/or with a defined repetition period during a time interval, which may at least partly include the reporting time window. The wireless device may be adapted for determining as discussed herein. A data transmission may be considered to be scheduled for a transmission time if it is scheduled and/or planned to be transmitted at the transmission time, and/or if it is transmitted at the transmission time. A transmission time may be considered to be within the reporting time window if is at or later than the beginning time of the reporting time window and if it is at or earlier than the end time of the reporting time window. Determining whether data transmission is scheduled for a transmission time may comprise determining whether the wireless device switches or is scheduled to switch to a RRC connected status, which may require transmitting of data and/or performing a random access procedure.

Transmitting a report together with other data, e.g. a data transmitted at a transmission time within a reporting time window may comprise including and/or appending the report to the data and/or transmitting the report after a connection initiation, e.g. a random access procedure, initiating the data transmission and/or connecting the wireless device with the network node for communication, in particular cellular communication, and/or after a random access procedure common to the data transmission and the report and/or without performing an additional random access procedure and/or after bringing the wireless device into a RRC connected state for transmitting the data.

A data transmission scheduled for a transmission time may pertain to data to be transmitted, in particular to data different from the report.

Generally, transmitting the report at or after the end of the reporting time window may be triggered and/or caused by the end of the reporting time window being reached without the report having been sent. The wireless device may be adapted for triggering transmitting the report if the end of the time reporting window has been reached.

Determining a reporting time window and/or measurement time, by a network node, may comprise receiving corresponding information or parameters from another network node or wireless device and/or reading such from a memory and/or calculating and/or estimating and/or setting the reporting time window and/or measurement time, in particular a measurement period, by the network node.

Transmission of data and/or a report to the network or a network node may generally comprise entering or changing to, by the wireless device, a communication mode, e.g., a RRC connected mode and/or by initiating and/or performing a random access procedure. The wireless device may be covered by a cell and/or in communication with the network or network node for transmission of data. The transmission may be cellular transmission. It may be considered that the transmission is a D2D transmission. Generally, transmission of data or a report may be performed if the wireless device is in coverage and/or may communicate with the network; if the wireless device is out of coverage, the report may be stored by the wireless device. The wireless device may be adapted for, and/or comprise a storing module for, storing usage information and/or report/s if the wireless device is out of network coverage, in particular if the wireless device is adapted for and/or participating in D2D communication.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may be between nodes of a wireless communication network and/or in a wireless communication network. It may be envisioned that a node in or for communication, and/or in, of or for a wireless communication network is adapted for, and/or for communication utilizing, one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes of the communication. It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header. Each node involved in such communication may comprise radio circuitry and/or control circuitry and/or antenna circuitry, which may be arranged to utilize and/or implement one or more than one radio access technologies. Radio circuitry of a node may generally be adapted for the transmission and/or reception of radio waves, and in particular may comprise a corresponding transmitter and/or receiver and/or transceiver, which may be connected or connectable to antenna circuitry and/or control circuitry. Control circuitry of a node may comprise a controller and/or memory arranged to be accessible for the controller for read and/or write access. The controller may be arranged to control the communication and/or the radio circuitry and/or provide additional services. Circuitry of a node, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered. A node of a wireless communication network may be implemented as a Wireless device and/or user equipment and/or base station and/or relay node and/or any device generally adapted for device-to-device communication. A wireless communication network may comprise at least one of a device configured for device-to-device communication, a wireless device, and/or a user equipment and/or base station and/or relay node, in particular at least one user equipment, which may be arranged for device-to-device communication with a second wireless device or node of the wireless communication network, in particular with a second user equipment. A node of or for a wireless communication network may generally be a wireless device configured for wireless device-to-device communication, in particular using the frequency spectrum of a cellular and/or wireless communications network, and/or frequency and/or time resources of such a network. Device-to-device communication may optionally include broadcast and/or multicast communication to a plurality of devices or nodes. A cellular network may comprise a network node, in particular a radio network node, which may be connected or connectable to a core network, e.g. a core network with an evolved network core, e.g. according to LTE. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A wireless device or user equipment (UE) may generally be a device configured for wireless device-to-device communication (it may be a wireless device) and/or a terminal for a wireless and/or cellular network, in particular a mobile terminal, for example a mobile phone, smart phone, tablet, PDA, etc. A user equipment may be a node of or for a wireless communication network as described herein, in particular a wireless device. It may be envisioned that a wireless device user equipment or wireless device is adapted for one or more RATs, in particular LTE/E-UTRA. A user equipment or wireless device may generally be proximity services (ProSe) enabled, which may mean it is D2D capable or enabled. It may be considered that a user equipment or wireless device comprises radio circuitry and/or control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A node or device of or for a wireless communication network, in particular a node or device for device-to-device communication, may generally be a user equipment or wireless device. It may be considered that a user equipment is configured to be a user equipment adapted for LTE/E-UTRAN.

A network node may be a base station, which may be any kind of base station of a wireless and/or cellular network adapted to serve one or more wireless device or user equipments. It may be considered that a base station is a node of a wireless communication network. A base station may be adapted to provide and/or define one or more cells of the network and/or to allocate or schedule frequency and/or time resources for communication to one or more nodes of a network, in particular UL resources, for example for device-to-device communication, which may be communication between devices different from the base station. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in device-to-device communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station, in particular according to LTE. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a controlling node and/or to allocate resources in particular for device-to-device communication between two nodes of a wireless communication network, in particular two user equipments.

Device-to-device (D2D) communication or operation may generally refer to communication between nodes or wireless devices of or for a wireless communication network or corresponding operation of one or more nodes, which may utilize the frequency spectrum and/or frequency and/or time resources of the network, in particular according to LTE/E-UTRAN. The communication may be wireless communication. A device in this context may be a node of the wireless communication network, in particular a user equipment or a base station. Device-to-device communication may in particular be communication involving at least one user equipment, e.g. between two or more user equipments. Device-to-device communication may be relayed and/or provided via a base station or coordinating node or relay node, in particular without interaction with a core network and/or layers of the network above a base station or coordinating node, or be direct communication between two devices, e.g. user equipments, without involvement of a base station or controlling node and/or with a base station or controlling node providing merely auxiliary services, e.g. configuration data or a transmission configuration or related information for a message intended for device-to-device communication between user equipments. D2D communication may be communication between two wireless devices in a region without cellular coverage and/or without interaction with a cellular or mobile network. In the latter case, it may be considered that data and/or signals flowing between the nodes performing device-to-device communication are not transported via a base station and/or controlling node. In contrast, during cellular communication, network layers above the eNB/base station/coordination node may generally be involved, in particular core layers which may be connected to the eNB/base station/coordinating node via cable/land line. During device-to-device communication, a message may be provided and/or transmitted and/or received. A device configured for and/or capable of device-to-device communication, which may be called wireless device or D2D enabled node, may comprise control circuitry and/or radio circuitry configured to provide device-to-device communication, in particular configured to enable proximity services (ProSe-enabled), e.g., according to LTE/E-UTRA requirements. D2D operation or communication and cellular operation or communication may be considered different operation types or modes, which may generally performed using resources from the same pool of available resources, e.g. allocated resources and/or the same carriers.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Resources or communication resources may generally be frequency and/or time resources. Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first wireless device to transmit to and/or for a second wireless device. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation node, may be adapted to determine and/or transmit corresponding allocation data indicating release or de-allocation of resources to one or more wireless devices, in particular to a first wireless device. Accordingly, D2D resource allocation may be performed by the network and/or by a node, in particular a node within and/or within a cell of a cellular network covering the wireless devices participating or intending to participate in the D2D communication.

Allocation data may be considered to be data indicating and/or granting resources allocated by the controlling or allocation node, in particular data identifying or indicating which resources are reserved or allocated for D2D communication for a wireless device and/or which resources a wireless device may use for D2D communication and/or data indicating a resource grant or release. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LIE.

In the context of this description, a wireless device generally may be a device capable of D2D communication and/or operation, in particular using frequencies and/or resources of a cellular and/or licensed communication system, e.g. a system according to a LTE standard, and may be also referred to as D2D enabled or capable UE or node. A wireless device may comprise any entity or equipment or device or node capable of at least receiving and/or transmitting radio signals on a direct radio link, i.e., between the entity and another D2D capable entity or wireless device. A wireless device or wireless device may for example be comprised in or comprise a cellular UE, PDA, a wireless device, laptop, mobile, sensor, relay, D2D relay, a small base station employing a UE-like interface, etc. Any device or entity capable to support and/or perform at least one D2D operation may be considered a wireless device; a wireless device may be adapted to support and/or perform at least one D2D operation. A wireless device may generally be adapted for cellular operation and/or communication in a wireless communication network. It may be considered that a wireless device generally comprises radio circuitry and/or control circuitry for wireless communication, in particular D2D operation or communication and cellular operation or communication. A wireless device may comprise a software/program arrangement arranged to be executable by a hardware device, e.g. control circuitry, and/or storable in a memory of e.g. a UE or terminal, which may provide D2D functionality and/or corresponding control functionality to e.g. a UE or terminal. D2D operation may comprise any action or activity related to D2D or D2D communication and may be used interchangeably with D2D communication. D2D operation may include, e.g., transmitting or receiving a signal/channel type or data for D2D purposes and/or in D2D operation, transmitting or receiving data by means of D2D communication, transmitting or receiving control or assistance data for D2D purpose, transmitting or receiving a request for control or assistance data for D2D, selecting a D2D operation mode, initiating/starting D2D operation, switching to D2D operation mode from a cellular operation mode, configuring receiver or transmitter with one or more parameters for D2D.

D2D operation may be for a commercial purpose or to support public safety, using the data related to D2D. D2D operation may or may not be specific to a certain D2D service. A D2D receive operation may be, and/or be comprised in, a D2D operation, which may, in one example, also involve other than D2D receive operations. A D2D operation may generally be performed or performable by a wireless device or UE. A D2D receive operation may comprise receiving, by a wireless device, of D2D data and/or signals. A D2D transmit operation may comprise, transmitting, by a wireless device, of D2D data and/or signals. A wireless device performing at least one D2D operation may be considered to be in D2D or D2D mode or in D2D operation. D2D operation may comprise D2D measurements.

A D2D measurement may be a measurement, e.g. performed by a wireless device, performed for D2D purpose and/or on D2D signals/channels and/or regarding D2D operation and/or communication. D2D measurement may comprise any one or any combination of: D2D RRM measurement, D2D positioning measurement, D2D synchronization measurement, measurement on D2D synchronization signals, measurement on D2D reference signals, measurement on D2D channel/s, signal-to-noise measurement, signal strength measurement, signal quality measurement, in particular measurement of received signal strength, of received signal quality, RLM, synchronization, one-directional and/or two-directional timing measurement, RTT or Rx-Tx or similar measurement, measurement of number of successful and/or unsuccessful channel decodings or receptions, data throughput measurements, measurement of amount of data transmitted and/or received, billing-relevant measurement; these measurement may be performed regarding D2D communication and/or D2D operation.

Cellular operation (in particular by a wireless device or UE) may comprise any action or activity related to a cellular network (any one or more RATs). Some examples of cellular operation may be a radio signal transmission, a radio signal reception, performing a radio measurement, performing a mobility operation or RRM related to a cellular network.

D2D transmission or communication may be any transmission or communication by a wireless device or device and/or in a D2D operation or mode or communication. Some examples of D2D transmission may comprise physical signals or physical channels, dedicated or common/shared, e.g., reference signal, synchronization signal, discovery channel, control channel, data channel, broadcast channel, paging channel, scheduling assignment (SA) transmissions, etc. A D2D transmission on a direct radio link may be intended for receiving by another wireless device. A D2D transmission may be a unicast, groupcast, or broadcast transmission. A D2D transmission may be on the uplink time-frequency resources of a wireless communication system.

A network node may be a controlling node connected or connectable to a wireless device for cellular and/or D2D communication. A controlling node may be defined by its functionality of configuring the wireless device, in particular in regards to measuring and/or reporting data pertaining to D2D operation. A controlling node may be a network node that is adapted to schedule, decide and/or select and/or allocate, at least in part, time-frequency resources to be used for at least one of: cellular communication or transmissions and D2D communication or transmissions. The controlling node may also provide scheduling information to another node, such as another wireless device, a cluster head, a radio network node such as eNodeB, or a network node (e.g. a core network node), MME, positioning node, D2D server, RNC, SON, etc). The network node or controlling node may be or communicate with a radio network node. It may be envisioned that a controlling node may also perform coordination and/or control for one or more wireless device or UEs. The coordination and/or control may be performed in a centralized or distributed manner. A controlling node may be referred to as an allocating node and/or a coordinating node.

A network device or node and/or a wireless device may be or comprise a software/program arrangement arranged to be executable by a hardware device, e.g. control circuitry, and/or storable in a memory, which may provide D2D functionality and/or corresponding control functionality.

A cellular network or mobile or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, WiFi, WLAN, WiMAX, etc.

A network node may generally be a radio network node (which may be adapted for wireless or radio communication, e.g. with a wireless device or a UE) or another network node. A network node generally may be a controlling node. Some examples of a radio network node or controlling node are a radio base station, in particular an eNodeB, a relay node, an access point, a cluster head, RNC, etc. The radio network node may be comprised in a mobile communication network and may support and/or be adapted for cellular operation or communication and/or D2D operation or communication.

A network node, in particular a radio network node, may comprise radio circuitry and/or control circuitry, in particular for wireless communication. Some examples of a network node, which is not a radio network node, may comprise: a core network node, MME, a node controlling at least in part mobility of a wireless device, SON node, O&M node, positioning node, a server, an application server, a D2D server (which may be capable of some but not all D2D-related features), a node comprising a ProSe function, a ProSe server, an external node, or a node comprised in another network. Any network node may comprise control circuitry and/or a memory.

A network node may be considered to be serving a wireless device or UE, if it provides a cell of a cellular network to the served node or wireless device or UE and/or is connected or connectable to the wireless device or UE via and/or for transmission and/or reception and/or UL and/or DL data exchange or transmission and/or if the network node is adapted to provide the wireless device or UE with allocation and/or configuration data and/or a measurement performance characteristic and/or to configure the wireless device or UE.

A wireless device may generally be a node or device adapted to perform D2D communication, in particular transmission and/or reception, and/or at least one type of D2D operations. In particular, a wireless device may be a terminal and/or user equipment and/or D2D enabled machine and/or sensor. The wireless device may be adapted to transmit and/or receive D2D data based on allocation data, in particular on and/or utilizing resources indicate in the allocation data. D2D communication and/or transmission by a wireless device may generally be in UL resources and/or corresponding carrier or frequency and/or modulation. A wireless device (such as a UE) may be adapted for and/or capable of CA or CA operation. In particular, it may be adapted to transmit and/or receive one or more than one CCs and/or utilising, and/or participating in, carrier aggregation. A wireless device may be adapted to configure itself and/or be configured according to configuration data, which may include setting up and/or scheduling resources and/or equipment for receiving and/or transmitting and/or sharing of resources and/or in particular D2D operation and/or cellular operation based on the configuration data. Configuration data may be received, by the wireless device, from another node or wireless device, in particular a network node.

A network node may generally be adapted to provide and/or determine and/or transmit configuration data, in particular to a wireless device. Configuration data may be considered to be a form of allocation data and/or may be provided in the form of a message and/or data packet/s. Configuring a wireless device or UE, e.g. configuring of the node by a network node, may include determining and/or transmitting configuration data to the node to be configured, i.e. the wireless device or UE. Determining the configuration data and transmitting this data to a wireless device or UE may be performed by different nodes, which may be arranged such that they may communicate and/or transport the configuration data between each other, in particular such that the node determining or adapted to determine the configuration data may transmit the configuration data to the node transmitting it or adapted to transmit it; the latter node may be adapted to receive the configuration data and/or relay and/or provide a message bases on the configuration data, e.g. by reformatting and/or amending and/or updating data received.

Cellular DL operation and/or communication of a wireless device or UE may refer to receiving transmissions in DL, in particular in cellular operation and/or from a network node/eNB/base station. Cellular UL operation of a wireless device or UE may refer to UL transmissions, in particular in cellular operation, e.g. transmitting to a network or network node/eNB/base station.

Each or any one of the wireless devices or user equipments shown in the figures may be adapted to perform the methods to be carried out by a user equipment or wireless device described herein. Alternatively or additionally, each or any of the wireless devices or user equipments shown in the figures may comprise any one or any combination of the features of a user equipment or wireless device described herein. Each or any one of the network nodes or controlling nodes or eNBs or base stations shown in the figures may be adapted to perform the methods to be carried out by network node or base station described herein. Alternatively or additionally, the each or any one of the controlling or network nodes or eNBs or base stations shown in the figures may comprise any one or any one combination of the features of a network node or eNB or base station described herein.

Some abbreviations used are:
3GPP 3rd Generation Partnership Project
Ack/Nack Acknowledgment/Non-Acknowledgement, also A/N
AP Access point
BER/BLER Bit Error Rate, BLock Error Rate;
BS Base Station
CA Carrier Aggregation
CoMP Coordinated Multiple Point Transmission and Reception
CQI Channel Quality Information
CRS Cell-specific Reference Signal
CSI Channel State Information
CSI-RS CSI reference signal
D2D Device-to-device
DL Downlink
EPDCCH Enhanced Physical DL Control CHannel
DL Downlink; generally referring to transmission of data to a node/into a direction further away from network core (physically and/or logically); in particular from a base station or eNodeB to a wireless device or UE; often uses specified spectrum/bandwidth different from UL (e.g. LTE)
eNB evolved NodeB; a form of base station, also called eNodeB
E-UTRA/N Evolved UMTS Terrestrial Radio Access/Network, an example of a RAT f1, f2, f3, . . . , fn carriers/carrier frequencies; different numbers may indicate that the referenced carriers/frequencies are different
f1_UL, . . . , fn_UL Carrier for Uplink/in Uplink frequency or band
f1_DL, . . . , fn_DL Carrier for Downlink/in Downlink frequency or band
FDD Frequency Division Duplexing
ID Identity
IMSI International Mobile Subscriber Identity
L1 Layer 1
L2 Layer 2
LTE Long Term Evolution, a telecommunications or wireless or mobile communication standard
MAC Medium Access Control
MBSFN Multiple Broadcast Single Frequency Network
MDT Minimisation of Drive Test
MPC Measurement Performance Characteristic
NW Network
OFDM Orthogonal Frequency Division Multiplexing
O&M Operational and Maintenance
OSS Operational Support Systems
PC Power Control
PDCCH Physical DL Control CHannel
PH Power Headroom PHR Power Headroom Report
PLMN Public Land Mobile Network
ProSe Proximity Service/s, another name for D2D
PSS Primary Synchronization Signal
PUSCH Physical Uplink Shared CHannel
RA Random Access
RACH Random Access CHannel
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SINRISNR Signal-to-Noise-and-Interference Ratio; Signal-to-Noise Ratio
SFN Single Frequency Network
SON Self Organizing Network
SSS Secondary Synchronization Signal
TPC Transmit Power Control
TX transmission/transmitter, transmission-related
TDD Time Division Duplexing
UE User Equipment
UICC Universal Integrated Circuit Card; card used for mobile/cellular communication in a UE
UL Uplink; generally referring to transmission of data to a node/into a direction closer to a network core (physically and/or logically); in particular from a wireless device or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency These and other abbreviations may be used according to LTE standard definitions.

In this description, for purposes of explanation and not limitation, specific details are set forth (such as particular network functions, processes and signalling steps) in order to provide a thorough understanding of the technique presented herein. It will be apparent to one skilled in the art that the present concepts and aspects may be practiced in other embodiments and variants that depart from these specific details. For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

What is claimed is:

1. A method of operating a wireless device in a wireless communication network, the method comprising:
monitoring Device-to-Device (D2D) operations of the wireless device and recording corresponding usage information according to a configured measurement period, for reporting to the wireless communication network according to a configured reporting window; and
responsive to the wireless device being within radio coverage of the wireless communication network and having recorded usage information to report, sending the recorded usage information to the wireless communication network responsive to the end of the configured measurement period having been reached and either of the following occurring: reaching the end of the configured reporting window without the wireless device having sent the recorded usage information, or the wireless device temporarily connecting to the wireless communication network before reaching the end of the configured reporting window, for a purpose independent of sending the recorded usage information.

2. A wireless device configured for operation in a wireless communication network, the wireless device comprising:
radio circuitry; and
processing circuitry operatively associated with the radio circuitry for transmission and reception by the wireless device and configured to:
monitor Device-to-Device (D2D) operations of the wireless device and recording corresponding usage information according to a configured measurement period, for reporting to the wireless communication network according to a configured reporting window; and
responsive to the wireless device being within radio coverage of the wireless communication network and having recorded usage information to report, send the recorded usage information to the wireless communication network responsive to the end of the configured measurement period having been reached and either of the following occurring: reaching the end of the configured reporting window without the wireless device having sent the recorded usage information, or the wireless device temporarily connecting to the wireless communication network before reaching the end of the configured reporting window, for a purpose independent of sending the recorded usage information.

3. A non-transitory computer readable medium storing a computer program comprising program instructions that, when executed by processing circuitry of a wireless device configured for operation in a wireless communication network, cause the wireless device to:

monitor Device-to-Device (D2D) operations of the wireless device and recording corresponding usage information according to a configured measurement period, for reporting to the wireless communication network according to a configured reporting window; and responsive to the wireless device being within radio coverage of the wireless communication network and having recorded usage information to report, send the recorded usage information to the wireless communication network responsive to the end of the configured measurement period having been reached and either of the following occurring: reaching the end of the configured reporting window without the wireless device having sent the recorded usage information, or the wireless device temporarily connecting to the wireless communication network before reaching the end of the configured reporting window, for a purpose independent of sending the recorded usage information.

\* \* \* \* \*

UNITED STATES PATENT AND TRADEMARK OFFICE
CERTIFICATE OF CORRECTION

PATENT NO. : 10,887,902 B2
APPLICATION NO. : 16/717614
DATED : January 5, 2021
INVENTOR(S) : Shrader et al.

It is certified that error appears in the above-identified patent and that said Letters Patent is hereby corrected as shown below:

In the Drawings

In Fig. 8, Sheet 8 of 8, delete Tag "N20" and insert Tag -- W20 --, therefor.

In the Specification

In Column 1, Line 6, delete "2017," and insert -- 2017, now abandoned, --, therefor.

In Column 1, Line 7, delete "2015," and insert -- 2015, now Pat. No. 9,723,624, --, therefor.

In Column 6, Line 7, delete "report's" and insert -- report/s --, therefor.

In Column 7, Line 21, delete "a eNB a base" and insert -- a eNB, a base --, therefor.

In Column 8, Line 19, delete "S12" and insert -- S12, --, therefor.

In Column 8, Line 46, delete "connectable with to" and insert -- connectable to --, therefor.

In Column 14, Line 15, delete "tablet." and insert -- tablet, --, therefor.

In Column 16, Line 4, delete "may generally" and insert -- may generally be --, therefor.

In Column 16, Line 57, delete "LIE." and insert -- LTE. --, therefor.

In Column 20, Line 27, delete "CQI Channel Quality Information" and insert -- CQI Channel Quality Indicator --, therefor.

In Column 20, Line 58, delete "MBSFN Multiple Broadcast Single Frequency Network" and insert -- MBSFN Multimedia Broadcast multicast service Single Frequency Network --, therefor.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,887,902 B2

In Column 21, Line 19, delete "SINRISNR" and insert -- SINR/SNR --, therefor.

In Column 21, Line 19, delete "Signal-to-Noise-and-Interference Ratio;" and insert -- Signal-to-Interference-and-Noise Ratio; --, therefor.